United States Patent [19]
Todaro et al.

[11] Patent Number: 4,700,161
[45] Date of Patent: Oct. 13, 1987

[54] COMBINED TRIP UNIT AND ACCESSORY MODULE FOR ELECTRONIC TRIP CIRCUIT BREAKERS

[75] Inventors: Frank A. Todaro, Clinton; Richard A. Dziura, Plainville; Roger N. Castonguay, Terryville, all of Conn.

[73] Assignee: General Electric Company, New York, N.Y.

[21] Appl. No.: 882,989

[22] Filed: Jul. 7, 1986

[51] Int. Cl.[4] ........ H01M 9/00

[52] U.S. Cl. ........ 335/172; 335/179; 335/236; 335/183

[58] Field of Search ........ 335/172, 174, 177, 179, 335/236, 170, 171, 181, 182, 183

[56] References Cited

U.S. PATENT DOCUMENTS

| | | | |
|---|---|---|---|
| 2,151,400 | 3/1939 | Williams | 335/181 |
| 3,264,424 | 8/1966 | Baermann | 335/182 |
| 4,013,926 | 3/1977 | Lang et al. | 361/115 |
| 4,213,109 | 7/1980 | Marcoz | 335/174 |
| 4,581,597 | 4/1986 | Walley | 335/179 |
| 4,589,052 | 5/1986 | Dougherty | 361/94 |

FOREIGN PATENT DOCUMENTS

| | | |
|---|---|---|
| 0138429 | 4/1985 | European Pat. Off. . |
| 187966 | 3/1906 | Fed. Rep. of Germany . |

OTHER PUBLICATIONS

Henry Willard, "Combined Accessory and Trip Actuator Unit for Electronic Circuit Breakers", Ser. No. 759,979, filed Jul. 29, 1985.

Frank A. Todaro et al., "Trip Actuator for Molded Case Circuit Breakers", Ser. No. 862,929, filed May 14, 1986.

Ronald D. Ciarcia et al., "Interchangeable Mechanism for Molded Case Circuit Breaker", Ser. No. 817,213, filed Jan. 8, 1986.

*Primary Examiner*—Clifford C. Shaw
*Assistant Examiner*—Lincoln Donovan
*Attorney, Agent, or Firm*—Richard A. Menelly; Walter C. Bernkopf; Fred Jacob

[57] ABSTRACT

A combined trip actuator and accessory module for molded case circuit breakers is accessible in the field for user selected accessory options. The trip actuator includes a U-shaped stator with a permanent magnet at the end of one leg. A spring-loaded armature member extends across both legs to form a closed-loop magnetic circuit. The over-current trip coil and shunt trip coil are arranged on one leg with the undervoltage coil arranged on the other leg. The accessory module is accessible from the top surface of the breaker cover for field installation of the undervoltage and shunt trip coils to provide the corresponding undervoltage and shunt trip functions.

8 Claims, 8 Drawing Figures

COMBINED TRIP UNIT AND ACCESSORY MODULE FOR ELECTRONIC TRIP CIRCUIT BREAKERS

BACKGROUND OF THE INVENTION

User selected options, such as undervoltage release, shunt trip and indicating alarms for use with industrial rated molded case circuit breakers have heretofore been assembled during circuit breaker manufacture. The customer requirements were specified at the time of purchase and the custom circuit breakers having the requested accessories were obtained directly from the manufacturer. With the advent of high speed molded case industrial rated circuit breakers, it is economically advantageous for the customer to install the selected accessories in the field. The selected accessories could be purchased simultaneously with the breaker and field-installed at a substantial savings in delivery time and at minimum cost.

U.S. Pat. No. 4,013,926 describes a circuit breaker having both an electronic trip actuator and an under-voltage release mechanism. U.S. patent application Ser. No. 759,979, filed July 29, 1985, in the name of Henry Willard, discloses a common trip actuator having shunt trip and undervoltage capability. U.S. patent application Ser. No. 862,929, filed May 14, 1986, entitled "Trip Actuator For Molded Case Circuit Breakers", also describes a multi-functional trip actuator having under-voltage release facility. It is customary to assemble the trip actuators described within the aforementioned applications at the time of circuit breaker manufacture.

European patent application publication No. 138,429, entitled "Circuit Interrupter", discloses an accessory unit for thermal magnetic molded case circuit breakers which appears to be field-installable.

The purpose of the instant invention is to provide a combined trip actuator and accessory module that is specifically designed for field installation by the customer without requiring any special skills or special tools.

SUMMARY OF THE INVENTION

The invention comprises an electronic circuit breaker trip actuator and accessory module in the form of a U-shaped magnetic stator having a linear armature pivotally arranged thereon to form a closed magnetic loop. Removal of the linear armature provides immediate access to the stator for insertion of a shunt trip coil and an undervoltage release coil to the stator to provide shunt trip and undervoltage accessory function to the circuit breaker.

DESCRIPTION OF THE PREFERRED EMBODIMENT

Figure 1:
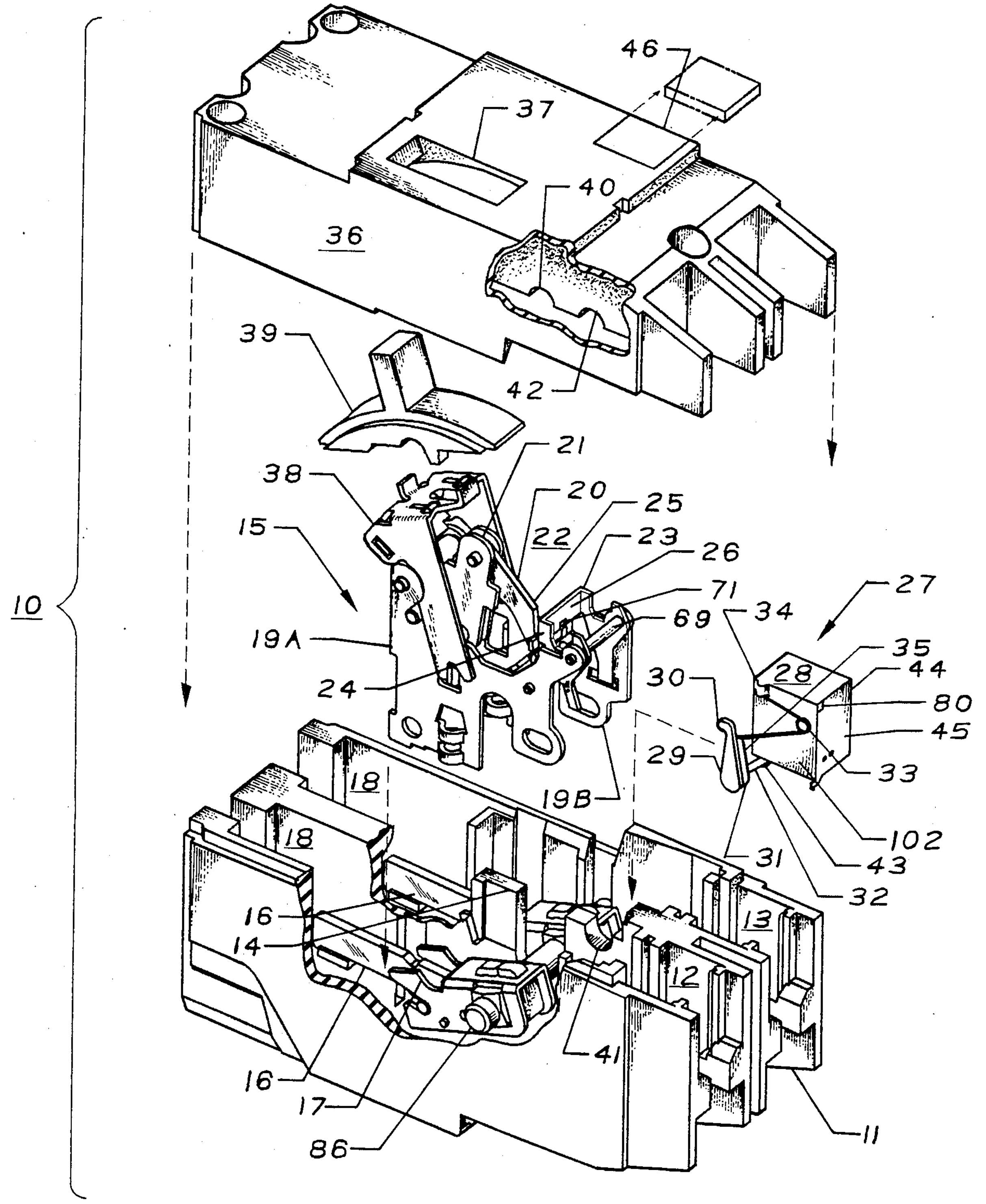
FIG. 1 is a top perspective view of a molded case circuit breaker in isometric projection containing the combined trip actuator and accessory module according to the invention.

An industrial rated molded case circuit breaker having an ampere rating of 15 to 1,200 amperes is depicted at 10 in FIG. 1, wherein a molded plastic case 11 is arranged in a two-pole configuration with a first compartment 12 and a second compartment 13 integrally formed with the case and separated from each other by means of a dividing wall 14. An operating mechanism 15 of the type described in U.S. patent application Ser. No. 817,213, filed Jan. 8, 1986, entitled "Interchangeable Mechanism For Molded Case Circuit Breaker", is mounted in the first compartment over a contact arm carrier 17 which supports a movable contact arm 16. The completely assembled circuit breaker includes a fixed contact arm and means for electrical interconnection with an external circuit and, although not shown, is completely described within the referenced U.S. patent application which should be reviewed for a better understanding thereof. The movable contact arm 16 extends within an arc chamber 18, which contains means for extinguishing an arc that occurs when the circuit breaker contacts are separated to interrupt the current through a protected circuit. The arc chute arrangement is also found within the aforementioned U.S. patent application. A similar contact arm and contact arm carrier are arranged within the second compartment 13 and are interconnected with the first movable contact arm 16 and contact arm carrier 17 by means of a crossbar 86, which extends between both compartments 12 and 13 through a crossbar slot 41. When completely assembled, both contact arms move in unison under the operation of a circuit breaker handle 39 mounted to the operating mechanism 15 by means of a handle yoke assembly 38. The operating mechanism is assembled between a pair of side frames 19A, 19B, which carries an operating cradle 20 for latching the breaker contacts in a closed condition by the engagement of a cradle hook 25 with a primary latch 24 and also by means of a secondary latch 23 mounted to the operating mechanism by means of a secondary latch pivot 69. The entire latch assembly 22, consisting of the primary and secondary latches as described within the referenced U.S. patent application, further includes a trip bar 26 pivotally arranged for moving the secondary latch 23 away from the primary latch 24 to thereby allow the cradle to be released by the primary latch and move the movable contacts into an open position. The handle 39 protrudes through a slot 37 arranged through the molded cover 36, which is securely attached to the molded case 11 by means of screws or rivets (not shown). In order to operate on the secondary latch 23 directly, a combined trip actuator and accessory module (hereafter "module"), generally indicated at 27, is arranged within the second compartment 13 such that a mechanical actuator 29, including a first pivotally mounted lever 30 and a second lever 31, is arranged with the first lever 30 within the first compartment 12 while the magnetic components for the module are contained within a molded plastic enclosure 28. A torsion spring 33 is arranged on the side of the module enclosure 28 and an armature latch support 32 is arranged within an opening 43 through the side of the module enclosure. An end of the first lever 30 is arranged for interaction with a tab 71 on the secondary latch 23, while the second lever 31 engages the torsion spring 33 by means of a protrusion 35 integrally formed on the second lever 31 for biasing the spring 33 against a protrusion 34 integrally formed on the exterior of the molded plastic enclosure. Electrical integrity between both poles is assured by the slots 41 cooperating with corresponding slots 40, 42 formed in the cover 36, which allow the crossbar 86 and the first operating lever 30 to extend within the first compartment 12 without allowing any electrical access between the electrical components within both poles.

Figure 2:
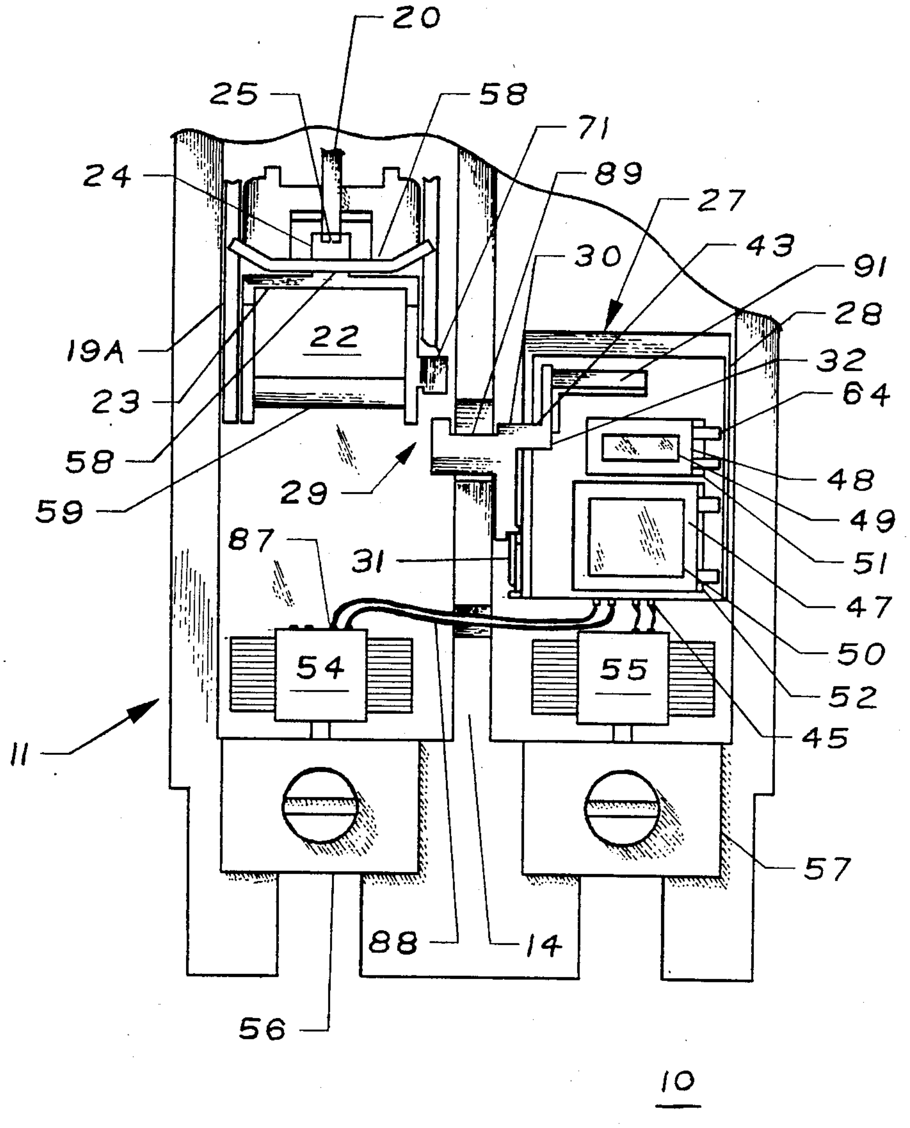
FIG. 2 is a top plan view of the circuit breaker of FIG. 1 with the cover removed.

The two-pole breaker 10 is shown in FIG. 2 with the cover removed. The current applied to the load side of the breaker over load straps 56, 57 is sensed through both poles by means of current transformers 54 and 55. The sensed current from the secondary windings is directed from terminal pins 87 and wires 88 to terminals 45 connecting an integrated circuit trip unit located under the module for processing. The trip unit is similar to that described within U.S. Pat. No. 4,589,052, entitled "Digital $I^2T$ Pickup, Time Bands And Timing Control Static Trip Circuit Breakers", which Patent is incorporated herein for reference. Upon determination of an overload condition, an output signal from the trip unit is fed to the module 27, which is internally interconnected with the trip unit. The mechanical actuator 29 is arranged within the circuit breaker case 11 such that the integrally formed bar 89 is rotatably supported within an opening 43 formed in the module enclosure 28.

Figure 3:
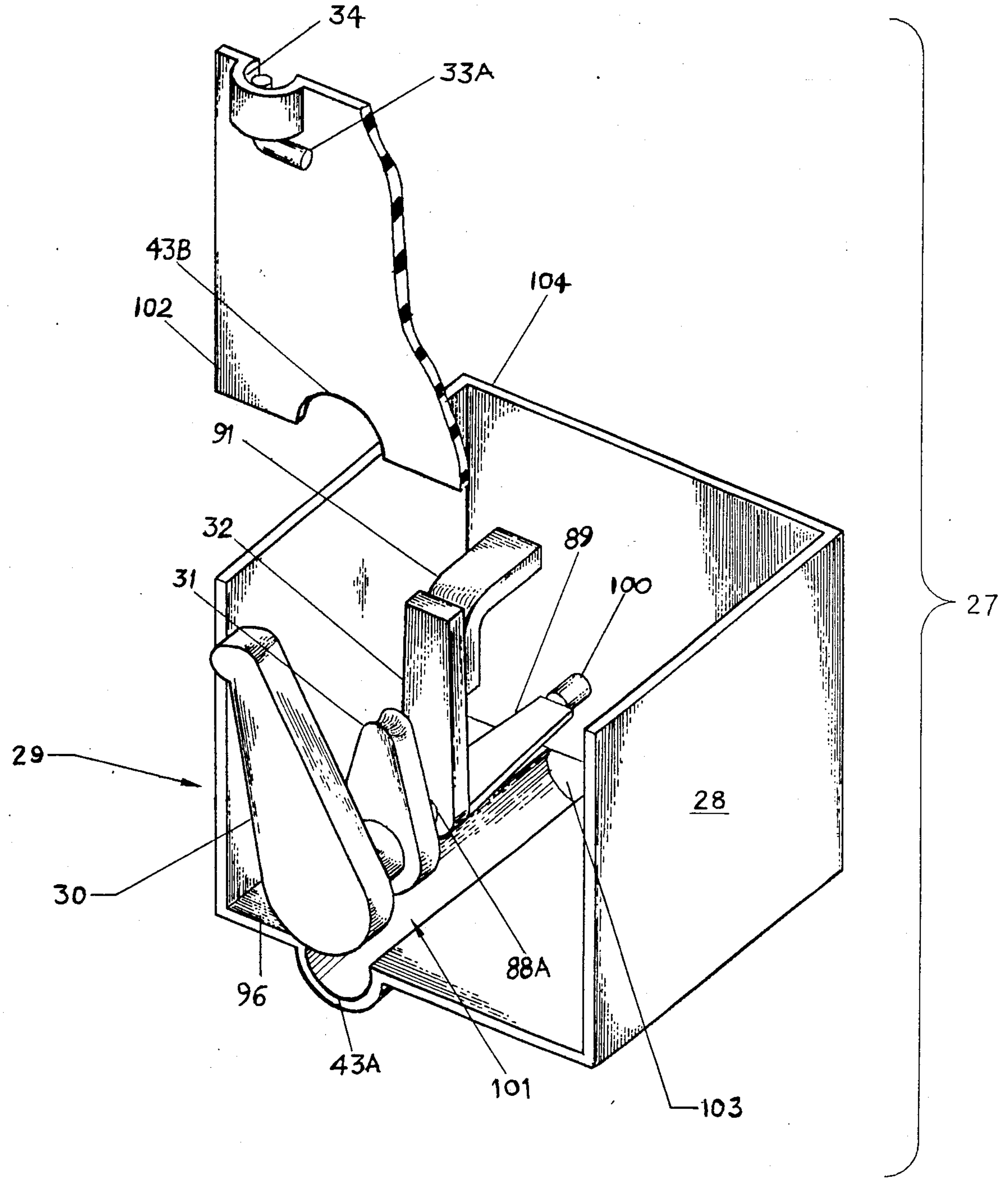
FIG. 3 is an exploded top perspective view of the enclosure of the combined trip actuator and accessory module of the invention with the mechanical actuator in isometric projection.
Figure 6:
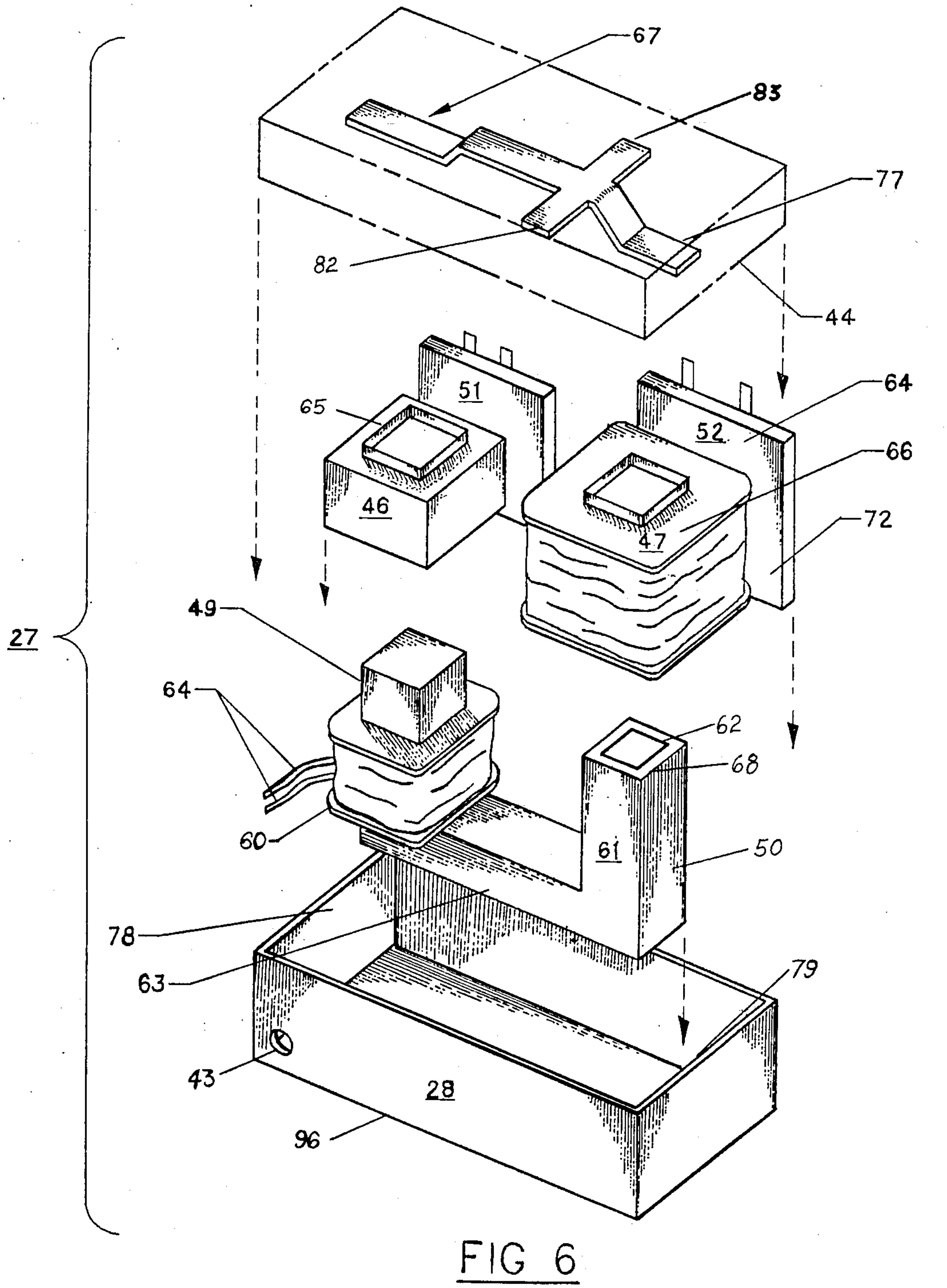
FIG. 6 is a top perspective view in isometric projection of the components of the combined trip actuator and accessory module of the invention prior to assembly.

The module enclosure 28 is shown in FIG. 3 prior to the insertion of the magnetic components which are illustrated separately in FIG. 6. The bottom 96 of the enclosure includes a groove 101 for rotation of the integrally formed bar 89 which is supported at end 100 within an opening 103 formed within the rear wall 104 of the enclosure. The opposite end of bar 89 is supported within a recess 43A formed in the bottom, which cooperates with a similar recess 43B to form a bearing surface for the raised diameter of the bar as indicated at 89A, when the front 102 is attached to the enclosure. The armature latch 91 attached to the armature latch support arm 32 is contained within the enclosure for interaction with the magnetic components while the first lever 30 and second lever 31 rotate exterior to the enclosure. The end 33A of the torsion spring 33 is supported exterior to the enclosure within the protrusion 34 integrally formed on the enclosure front 102.

Figure 4:
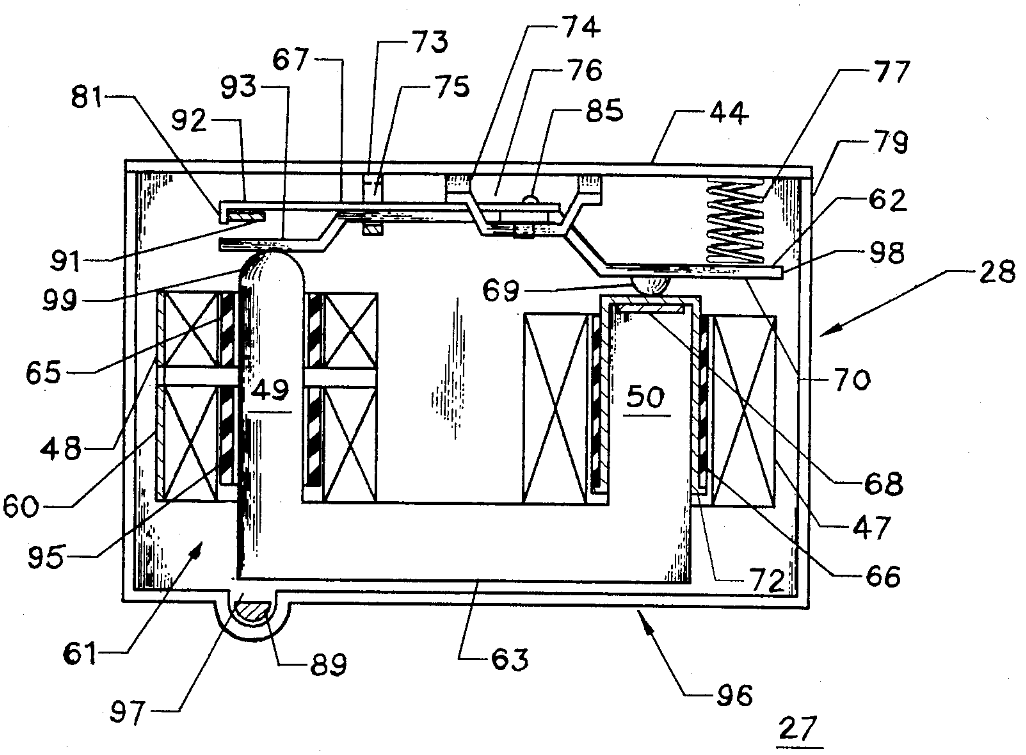
FIG. 4 is a side sectional view of the combined trip actuator and accessory module of the invention in a latched condition.
Figure 5:
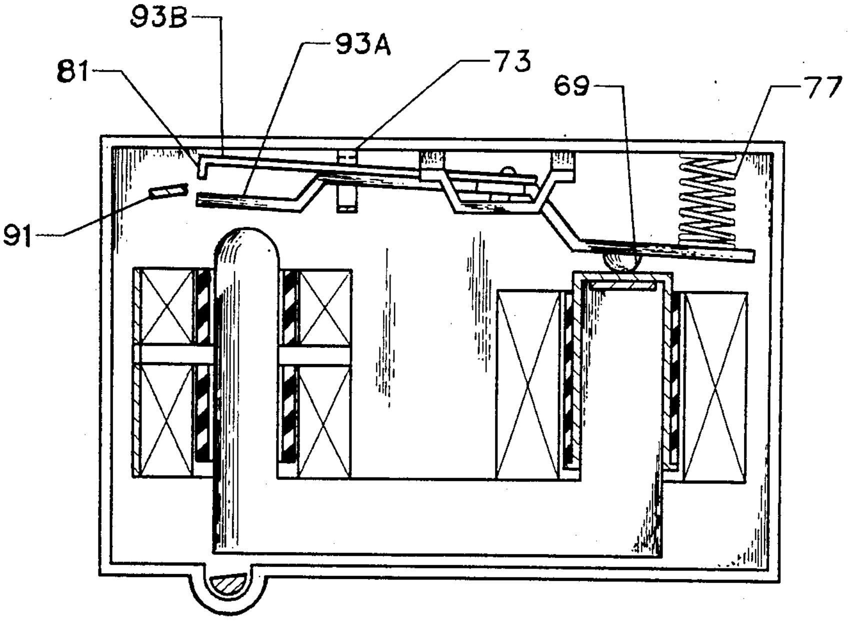
FIG. 5 is a partial side sectional view of the combined trip actuator and accessory module of FIG. 4 in an unlatched condition.
Figure 7:
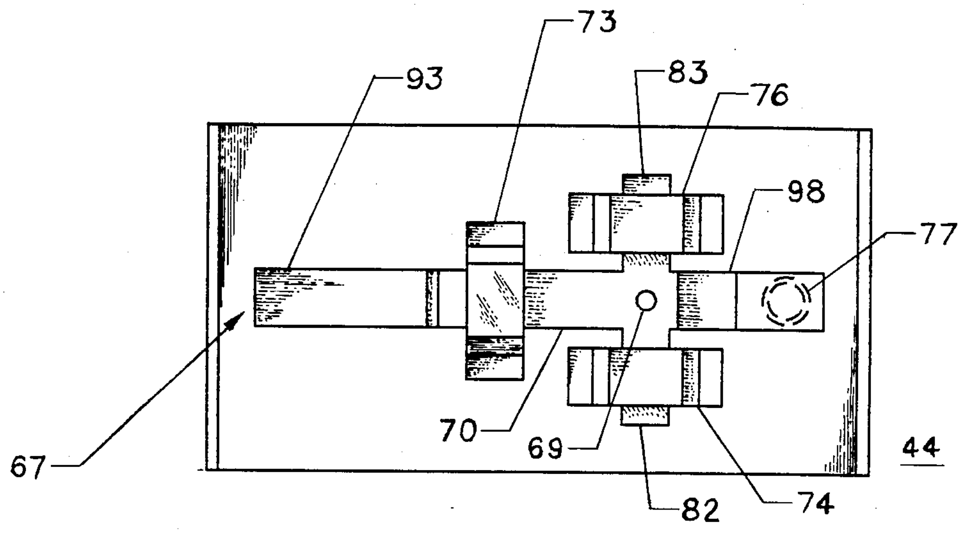
FIG. 7 is a bottom plan view of the combined actuator and accessory module cover.
Figure 8:
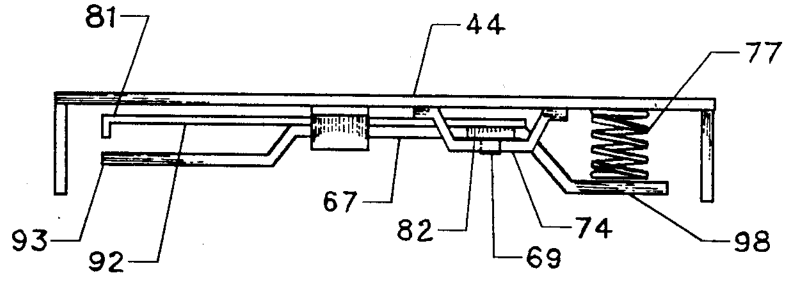
FIG. 8 is a side view of the combined actuator and accessory module cover depicted in FIG. 7.

The armature latchpiece 91 is fixedly attached to a support arm 32 formed with the bar 89 for release of the armature hook 81 formed at one end of the armature 67, best seen by referring now to FIGS. 4,5 and 6. The armature 67 is mounted within the module enclosure 28 by means of projections 73, 74 and apertures 75, 76 formed within the module cover 44. A trip spring 77 is trapped between the armature and the inside of the cover. Both the armature and trip spring are removed from the module when the cover is removed, as will be discussed below. The armature comprises a linear bar-shaped member 70, which contains a protrusion 69 for nesting against a magnetic shunt piece 72 arranged over the permanent magnet 68. An offset end 93 is formed on the front of the armature and an offset end 98 is formed at the rear of the armature, as best indicated in FIGS. 7 and 8. Referring to FIGS. 4 and 6, a pair of cross-pieces 82, 83 are formed within the linear bar-shaped member 70 and are retained within the apertures 75 formed within the cover. The armature 67, having an armature top arm 92 springingly attached to the linear bar member 70 by means of a rivet 85, is located within the aperture 75 formed in the protrusion 73. In the latched condition depicted in FIG. 4, the armature latchpiece 91 is retained under the armature hook 81 against the bias of trip spring 77 by magnetic attraction between the armature and the leg 49 of a U-shaped stator 61. A permanent magnet 68 is held within the recess 62 shown in FIG. 6 formed in the top surface of the stator leg 50. The magnetic flux is mainly supplied by the undervoltage coil 47, which transfers magnetic flux along the bight 63 up to the radial end 99 of the stator arm 49. The magnetic flux, in the absence of the magnetic shunt 72 and undervoltage coil 47, is supplied by the permanent magnet in the manner described within the aforementioned U.S. patent application to which reference should be made for a better understanding of the operation thereof without an undervoltage coil. Application of a trip signal to the trip coil 60, arranged around a coil form 95 on stator leg 49, opposes this magnetic flux and allows the trip spring to force the armature to the tripped condition indicated in FIG. 5 and allowing the armature hook 81 to move out from the armature latch piece 91. This allows the integrally formed bar 89 and levers 30, 31 shown in FIGS. 1, 2 and 3 to rotate into contact with the tab 71 on secondary latch 58 under the urgence of the torsion spring 33, allowing the cradle hook 25 to thereby move out from under the primary latch 24 to trip the breaker. The module 27, as depicted in FIG. 4, contains shunt trip function and undervoltage release function along with the basic overcurrent protection. This is achieved by the arrangement of a shunt trip coil 48 over a coil form 65 arranged around the stator leg 49. The coil is connected to a manually operated switch located remote from the breaker and, when a signal is applied, behaves in a manner similar to the trip coil 60 in opposing the magnetic flux generated within the stator by the permanent magnet. The undervoltage release function is provided by the arrangement of an undervoltage coil 47 around a coil form 66, which, in turn, is arranged around the stator leg 50. The coil form contains the magnetic shunt 72 in order to bypass or shunt a portion of the magnetic flux generated by the permanent magnet away from the stator. With the undervoltage coil form and shunt arranged around stator leg 50, the permanent magnet is unable to hold the offset end 93 of the armature 67 from rotating in a clockwise direction under the urgence of the trip spring 77. The application of a predetermined signal to the undervoltage coil adds sufficient flux to the stator and armature to overcome the trip spring bias. This is accomplished by mechanically positioning the armature 67 against the trip spring 77 as indicated in FIG. 4 and continuously applying the undervoltage coil signal. A counterclockwise torque on the armature offset 93 developed about the protrusion 69 holds the offset end 93 against the radial end 99 of the stator leg 49. When the applied signal decreases below the predetermined value, the torque produced by the magnetic flux generated by the undervoltage coil is insufficient to overcome the bias of the trip spring causing the armature to rotate in the clockwise direction, thereby releasing the latchpiece 91 and tripping the breaker.

After a tripping operation has occurred, the armature reaches the position indicated in FIG. 5. To return the module to the latched position shown in FIG. 4, the circuit breaker handle is first moved in a counterclockwise direction, as viewed from FIG. 1, to reset the operating mechanism 15, then in a clockwise direction to close the circuit breaker contacts. This brings the secondary latch tab 71 into contact with the end of the first lever 30, which, in turn, rotates the armature latch support arm 32 moving the armature latchpiece 91 along the top planar surface 93A of the offset front end 93 of the armature, as indicated in phantom in FIG. 5. When the circuit breaker handle has rotated to the fully closed position, the armature latchpiece has moved along the top sloped surface 93B forcing the armature to the latched position shown in FIG. 4.

Referring now to FIGS. 2 and 6, it is seen how the shunt trip and undervoltage release function can be field installable. Cover 44, depicted in phantom in FIG. 6, is removed from the module enclosure 28 which exposes the components therein, as depicted in FIG. 2. The removal of the cover carries with it both the armature and the trip spring such that the armature latchpiece 91 and the armature latchpiece support arm 32 assume the unlatched condition. The stator legs 49, 50 are now readily accessible for the insertion or removal of both the undervoltage and shunt trip coils 47, 48. The external electric circuit connection is made to these coils by connection of their attached printed wire boards 51, 52 to wires 64 arranged along the sides of the module. Once the selected undervoltage and shunt trip coils are inserted within the module, the module cover is then attached to position the armature and the trip spring over the coils, as shown in an unlatched condition indicated in FIG. 5. The circuit breaker handle is then moved to the latched and then to the closed position as described earlier to return the armature to the latched condition shown in FIG. 4.

FIG. 6 depicts the U-shaped stator 61 prior to insertion within the module enclosure 28 with the bight 63 coextensive with the bottom 96 of the enclosure and the stator legs 49, 50 coextensive with the opposite sides 78, 79. In the absence of the undervoltage coil 47, coil form 66 and shunt 72, the magnetic flux provided by the permanent magnet 68 within the recess 62 is now sufficient to hold the armature 67 against the bias of the trip spring 77. Energization of the trip coil 60 then produces a magnetic flux to oppose the flux of the permanent magnet and allows the armature to rotate to the tripped position upon the occurrence of an overcurrent condition. It is to be understood that the arrangement of the shunt trip coil 48 and coil form 65 over stator leg 49 does not effect the permanent magnet flux within the stator. Both the undervoltage coil and shunt trip coil 47, 48 are shown physically attached to respective printed wire boards 51, 52 for ease in assembly from the top of the module enclosure 28 and with the connecting wires 64 extending from the back of the printed wire boards to facilitate external connection. The circuit boards carry the required circuit components for supplying the aforementioned predetermined signals to the undervoltage and shunt trip coils. Once the stator and coil assembly is inserted within the enclosure, the cover 44 is hingedly attached to the enclosure bringing the armature into precise alignment with the stator legs 49, 50 and with the armature cross-pieces 82, 83 outboard thereof.

The arrangement of the armature 67 on the cover 44 is best seen by referring now to FIGS. 7 and 8. The trip spring 77 is first positioned on the cover and the offset end 93 is arranged under the apertured protrusion 73. The armature crosspieces 82, 83 are then arranged under the apertured protrusions 74 and the armature is arranged such that the protrusion 69 on the linear bar member 70 faces toward the interior of the enclosure. The top arm 92 containing the armature hook 81 is arranged between the offset end 93 and the cover 44, as indicated in FIG. 8.

Now referring back to FIG. 1, it is noted that the module cover 44, which is attached to the module enclosure 28 by means of a hinge 80, is readily accessible from the top of the breaker case 11 when access door 46 on the circuit breaker cover 36 is moved in the indicated direction without having to remove the circuit breaker cover. When the module cover 44 is open, the armature 67 attached to the cover moves with the cover thereby immediately releasing the armature hook from the armature latchpiece, causing the breaker operating mechanism to become articulated to trip the breaker in the manner described earlier.

It has thus been shown that a factory installed combined trip and accessory module within an enclosed breaker assembly, wherein the circuit breaker cover and case are fastened together, can be readily accessed for the insertion of undervoltage and shunt trip coils to provide corresponding shunt trip and undervoltage release facility.

Having thus described our invention, what we claim as new and desire to secure by Letters Patent is:

1. A combined trip actuator and accessory module for circuit interruption devices comprising:

an enclosure a magnetic stator within said enclosure having a first and a second leg joined by bight;

a removable armature pivotally arranged on said first leg and extending across said first and second legs, said armature comprising a linear bar terminating in opposing first and second offset ends;

a permanent magnet attached to said first leg and providing a closed loop magnetic flux path through said magnetic stator and said removable armature for holding said armature in a latched position;

a trip spring within said enclosure for biasing said armature in a tripped position;

a trip coil arranged on said second leg to oppose said magnetic flux and allow said trip spring to move said armature to said tripped position;

a holding coil removably arranged on said first leg to provide a holding magnetic flux to said stator and said armature to hold said armature in said latched position; and a latch arm springingly attached to said armature and extending over said second offset end.

2. The combined trip actuator and accessory module of claim 1 including means on said armature second offset end for engaging an armature latch mounted within a molded case circuit breaker assembly.

3. The combined trip actuator and accessory module of claim 1 including a cover hingably attached to said enclosure.

4. The combined trip actuator and accessory module of claim 3 wherein said armature is carried by said cover.

5. The combined trip actuator and accessory module of claim 4 wherein said trip spring is trapped between said cover and said armature.

6. The combined trip actuator and accessory module of claim 4 wherein said cover includes an apertured protrusion and wherein said armature is arranged within the aperture formed within said protrusion.

7. The combined trip actuator and accessory module of claim 1 including a magnetic shunt arranged over said permanent magnet to divert said permanent magnet flux away from said second leg.

8. The combined trip actuator and accessory module of claim 7 including a holding coil removably arranged on said first leg to provide a holding magnetic flux to said stator and said armature to hold said armature in said latched position.

* * * * *